April 21, 1959     J. R. REEDER ET AL     2,883,561
PROTECTIVE SYSTEM FOR ALTERNATING CURRENT GENERATORS
Filed April 3, 1958     2 Sheets-Sheet 1

April 21, 1959   J. R. REEDER ET AL   2,883,561
PROTECTIVE SYSTEM FOR ALTERNATING CURRENT GENERATORS
Filed April 3, 1958   2 Sheets-Sheet 2

United States Patent Office 2,883,561
Patented Apr. 21, 1959

2,883,561

PROTECTIVE SYSTEM FOR ALTERNATING-CURRENT GENERATORS

James R. Reeder and Ronald E. Hulsey, Lima, Ohio, assignors to Westinghouse Electric Corporation, East Pittsburgh, Pa., a corporation of Pennsylvania Application April 3, 1958, Serial No. 726,131

8 Claims. (Cl. 307—51)

The present invention relates to the protection of alternating current generators against overexcitation and underexcitation, and more particularly to the detection of overexcitation or underexcitation of any one generator in a system of alternating current generators operating in parallel.

When two or more alternating current generators are operated in parallel, the division of real load, that is, kilowatt load, between the generators is determined by their relative speeds and is independent of the voltage or excitation of the machines. The division of reactive load between the generators, however, is a function of the excitation of the machines, and if one generator becomes overexcited, due to loss of control by its voltage regulator or other fault in its excitation system, so that its voltage rises or tends to rise, the reactive current supplied by that generator increases and the reactive current supplied by the other generator or generators is reduced. Similarly, if one generator becomes underexcited so that its voltage tends to drop, the reactive current supplied by that generator decreases and the reactive current supplied by the other generators increases.

Either of these conditions is, of course, undesirable, and means are usually provided in such systems for controlling the voltage regulators to maintain proper division of reactive load. In case of a fault in the excitation system of any generator causing overexcitation or underexcitation, however, the division of reactive load changes as indicated above, with the faulted generator taking either more or less than its proper share of reactive load. Such a change in reactive load division, therefore, is an indication of an excitation fault and can be used to detect the occurrence of such a fault by providing suitable means for detecting unequal division of reactive load and for selecting the particular generator on which the fault has occurred.

This has been done heretofore by the means disclosed in a patent to Keith et al., No. 2,717,318, issued September 6, 1955. In the system of this patent, a current transformer loop is utilized to provide a signal current proportional to the difference in load currents of the generators. A voltage responsive device, such as a relay or a static voltage sensing device, is connected to respond to the voltage of each generator through a sensing transformer and a rectifier, and a mutual reactor is connected in series with the output of each sensing transformer and excited by the signal current obtained from the current transformer loop. As more fully explained below and in the Keith et al. patent, the phase relations are such that the reactive current components of the signal current from the current transformer loop cause the mutual reactors to modify the voltages to which the relays respond in such a way that the relay of a faulted generator is caused to operate and the relays of the good generators are prevented from operating.

This system has been successfully used but it has certain disadvantages. The phase relations of the output voltages of the mutual reactors are such that differences in real load division between the generators do not affect the operation of the system if the difference in real load between the generators is not too great. If large differences in real load occur, however, operation of the protective system is affected and false operation may occur when no excitation fault is present, which is obviously undesirable. Furthermore, the mutual reactors used in this system must be designed to have a substantially linear output voltage over the entire operating range, which requires the use of an air-gap in the reactor core to prevent saturation within the operating range. The manufacture of such a reactor is quite difficult since even very slight variations in the magnetic characteristics of the core material, and very small changes in the dimensions of the air-gap, cause relatively large variations in the output characteristics of the reactor. The manufacturing tolerances must be kept extremely close, therefore, and the manufacture of these reactors has involved a great deal of difficulty with resulting high cost.

The principal object of the present invention is to provide an improved protective system for detecting overexcitation or underexcitation of an alternating current generator in a system of paralleled generators, and for selecting the faulted generator.

Another object of the invention is to provide a system for protection against excitation faults in a parallel alternating current generator system which avoids the disadvantages of the prior system outlined above.

A further object of the invention is to provide a protective system for protection against excitation faults in a parallel alternating current generator system which uses the division of reactive load between generators for indication of such faults but which is substantially unaffected by unequal division of real load between the generators, and which requires no components which involve unusually difficult manufacturing problems.

Other objects and advantages of the invention will be apparent from the following detailed description, taken in connection with the accompanying drawings, in which.

Figure 1:
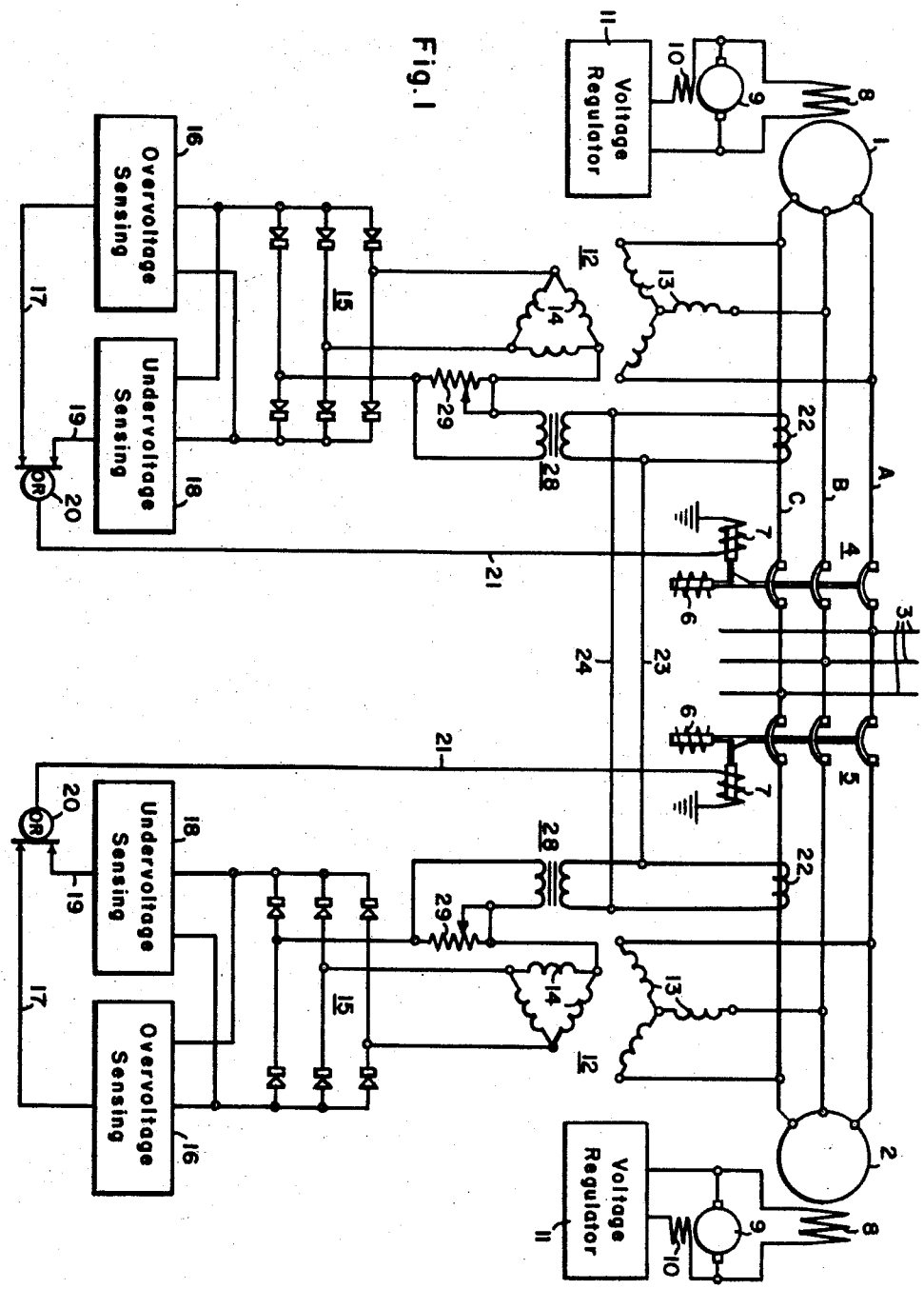
Figure 1 is a schematic diagram showing an illustrative embodiment of the invention.

The invention is shown in Fig. 1 applied to a generator system comprising two three-phase alternating current generators 1 and 2 connected in parallel to a load bus 3 by means of circuit breakers 4 and 5, respectively. Each of the circuit breakers 4 and 5 has a closing coil 6, which may be controlled manually or automatically in any desired manner, and a trip coil 7 controlled as described hereinafter, and which may also be controlled manually or by any additional automatic means as desired. The particular system shown for the purpose of illustration is of a type frequently used for supplying alternating current electrical systems for large airplanes, although the usefulness of the invention is obviously not restricted to this particular type of system. It will also be apparent that the invention is applicable to systems having more than two generators in parallel.

The generators 1 and 2 are shown as being identical three-phase machines, and each generator has a field winding 8 supplied with direct current from an exciter 9 which is shown for the purpose of illustration as a self-excited direct current generator having a shunt field winding 10. The excitation of the exciter 9 is controlled by a voltage regulator 11 which may be of any suitable type and which has not been shown in detail since it is not a part of the present invention. It is to be understood that the excitation system shown is merely illustrative and is to be taken as representing any suitable type of excitation system for supplying direct current excitation to the generator under the control of a voltage regulator of any suitable type which senses the output voltage of the generator and controls the exciter to maintain substantially constant generator voltage. The regulator 11 is preferably also controlled to normally maintain substantially equal division of reactive load between the generators, by the means shown and described in the above-mentioned Keith et al. patent, or by any other suitable means.

Each generator is also provided with means for responding to overvoltage or undervoltage. For this purpose a three-phase sensing transformer 12 is provided, for each generator, having its primary windings 13 connected to the generator terminals as shown. The secondary windings 14 of the transformer 12 are connected to a three-phase rectifier bridge 15, of any suitable type, to provide a direct current output which is proportional to the sum of the three phase voltages of the generator and thus to the average generator voltage. Overvoltage of the generator, or overexcitation, is detected by an overvoltage sensing device 16 connected across the output of the rectifier bridge 15. The sensing device 16 may be any suitable device, such as a relay, which is capable of responding to the voltage of the rectifier and providing a response or signal when the voltage exceeds a predetermined value. It is preferred, however, to utilize a static sensing device of any suitable type which will provide an output signal on conductor 17 when the voltage exceeds the predetermined value.

An undervoltage sensing device 18 is also connected across the output of the rectifier bridge 15 and may also be a relay or preferably a static voltage sensing device of any suitable type which will provide an output signal on the conductor 19 when the voltage of the rectifier 15 falls below a predetermined value which is lower than the voltage to which the overvoltage sensing device 16 responds.

The output signals from the voltage sensing devices 16 and 18 may be utilized to effect any desired operation in response to overvoltage or undervoltage and, in the illustrated embodiment, the signals from the sensing devices 16 and 18 are applied through an Or circuit 20 and a conductor 21 to energize the trip coil 7 of the circuit breaker. Thus, if the output voltage of the rectifier 15 exceeds a predetermined value, or if it falls below a lower predetermined value, the trip coil 7 is energized to cause the circuit breaker to open and disconnect the generator from the system. If desired or necessary, the generator field winding 8 may also be deenergized at the same time and the signal on the conductor 21 may also be utilized to effect this result in any suitable manner.

As previously explained, a fault in the excitation system of either of the generators which causes either overexcitation or underexcitation of the generator causes the generator to take either more or less than its proper share of the reactive load. The occurrence of such a fault can therefore be detected by detecting an unequal division of reactive load current. For this purpose, a current transformer 22 is connected in one phase lead of each generator, as shown, to be energized by the generator output current. The secondaries of the current transformers 22 are connected in a loop circuit by conductors 23 and 24. It will be seen that under normal conditions, when the load currents of the generators are equal, no current will flow in the current transformer loop. If the generator output currents become unequal, however, a circulating current will flow which may contain both reactive current components and real load current components or which may consist only of reactive current or of real load current. The presence of reactive components circulating in the current transformer loop circuit is utilized to indicate the existence of an excitation fault and means are provided to select the generator on which the fault exists.

Figure 2:
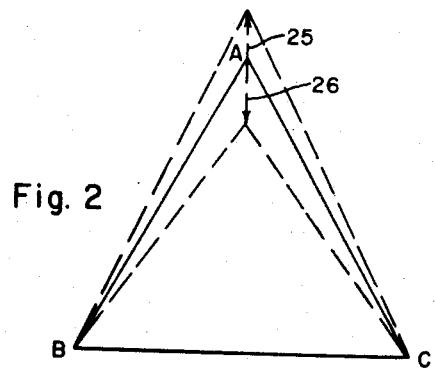
Figs. 2 and 3 are vector diagrams illustrating the operation of the system.

In the prior system disclosed in the Keith et al. patent, sensing transformers and a current transformer loop are used, substantially as just described, and a mutual reactor is connected in the output of each sensing transformer and excited by the current in the current transformer loop. The effect of this is illustrated in the vector diagrams of Figs. 2 and 3. Fig. 2 shows in solid lines, the three-phase output voltages of the sensing transformer under normal conditions, which are proportional to the output voltages of the generator. When an excitation fault occurs causing overexcitation of one generator, the mutual reactor of the Keith et al. patent adds a biasing voltage indicated by the vector 25, in the phase position shown, to the output voltages of the sensing transformer of the faulted generator. The mutual reactors of the other generators add biasing voltages of opposite phase, as indicated by the vector 26, to the output of the sensing transformers of the good generators. It will be seen that the effect of the biasing voltage 25 is to increase two of the phase voltages applied to the rectifier 15, as shown in dotted lines, and since the output of the rectifier is proportional to the sum of the voltages, the output voltage of the rectifier is increased sufficiently to cause a voltage sensing device to operate. The phase position of the bias voltages 26 added to the sensing transformer outputs of the good generators is opposite and reduces the output of the rectifier so that the voltage sensing devices of the good generators are prevented from operating. Thus the mutual reactors used in this prior system provide an indication of the occurrence of an excitation fault and select the faulted generator.

Figure 3:
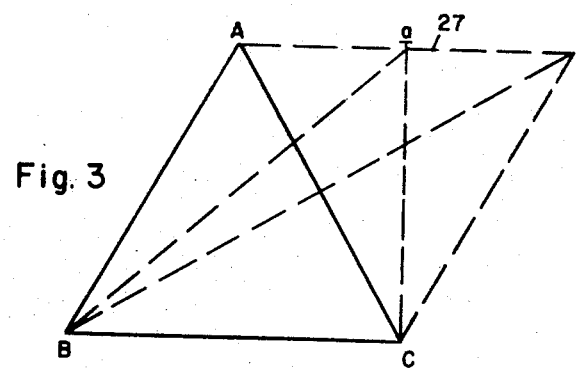

Fig. 3 illustrates the effect of real load current components in the current transformer loop. These components are, of course, in quadrature with the reactive current components, and the voltage component of the mutual reactor due to real load difference is added to the sensing transformer output as shown by the vector 27 in Fig. 3. It will be seen that as long as the difference in real load is such that the value of the vector 27 does not exceed that corresponding to the point a of Fig. 3, the effect is to increase one phase voltage of the sensing transformer output and decrease another phase, so that the net effect is extremely small and differences in real load have only a negligible effect on the operation of the system. If large differences in real load occur, however, so that the length of the vector 27 exceeds that corresponding to the point a both phase voltages are increased, and the sum of the sensing transformer output voltages is increased, so that false operation of the voltage sensing device may occur even when no excitation fault is present if large differences in real load occur. This is an undesirable feature of the system of the Keith et al. patent which is eliminated by the present invention.

In accordance with the present invention, a saturating current transformer 28 for each generator is connected to the loop circuit 23—24. The current transformer 28 is thus energized by current flowing in the loop circuit which, as previously explained, is proportional to the difference in output currents of the generators. The output voltage of the current transformer 28 is applied to an adjustable resistor 29 which is connected, as shown, in series in one phase of the output of the sensing transformer 12. Thus, the bias voltage which appears across the resistor 29 is added to the output voltage of the sensing transformer to modify the voltage to which the voltage sensing devices 16 and 18 respond.

The phase relations of these voltages are such that the component of the voltage across the resistor 29 due to reactive load components in the current transformer input adds to the output voltage of the sensing transformer 12 in the manner shown in Fig. 2. Thus when an overexcitation fault occurs, a bias voltage 25 is added to the output of the sensing transformer of the faulted generator which increases the output voltage of the rectifier 15 to cause the overvoltage sensing device 16 to operate. A bias voltage 26 of opposite phase position is added to the sensing transformer outputs of the good generators, reducing the output voltage so that their sensing devices 16 are prevented from operating. Thus, the breaker of the faulted generator is tripped and the generator removed from the system while the good generators are not affected.

If an underexcitation fault occurs, a similar action takes place. Thus, since the underexcited generator is taking less than its share of reactive current, the bias voltage across its resistor 29 will be in the position of the vector 26, reducing the output voltage of the rectifier 15 to such a low level that the undervoltage sensing device 18 operates. The bias voltages added to the sensing transformer outputs of the good generators will be in the position of the vector 25 so that their rectifier output voltages are increased and the undervoltage sensing devices are prevented from operating. The voltage levels at which the overvoltage and undervoltage devices operate can readily be made sufficiently different to provide adequate discrimination between these two conditions.

Figure 4:
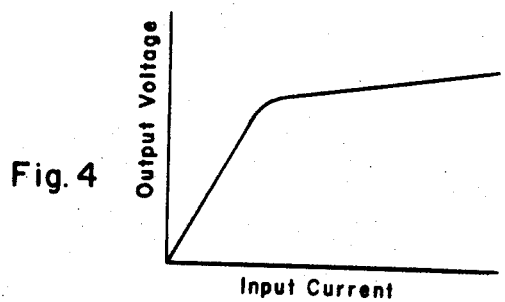
Fig. 4 is a diagram illustrating the preferred characteristics of a current transformer utilized in the system.

As previously indicated, the current transformers 28 are saturable transformers and are preferably wound on cores of magnetic material having a substantially rectangular hysteresis loop. The cores are designed to saturate at a value of input current such that the system is made relatively insensitive to differences in real load. That is, the transformer 28 is designed to have a characteristic such as that shown in Fig. 4, with a substantially linear relation between input current and output voltage. The bias voltages added to the sensing transformer outputs by the resistors 29 due to real load components are in the phase position of the vector 27 of Fig. 3, and the transformers 28 are designed to saturate at a point approximately corresponding to the point $a$ of Fig. 3. For differences in real load below this value, the output voltage of the rectifier 15 is not substantially changed, as previously explained, and if the real load difference exceeds this value, the transformer saturates and does not substantially increase its output voltage. Thus, the system is insensitive even to quite large differences in real load.

The use of the saturating current transformer also has a further advantage since a current transformer inherently has an output voltage which is linear with input current, so that the transformer can be wound on a toroidal core with no air gap and can be made to saturate at the desired point to eliminate false operation due to large real load differences without affecting its performance in the system. Furthermore, since the output current of a current transformer is essentially constant over a considerable range, the value of the bias voltage added to the sensing transformer output can be adjusted by means of the adjustable resistor 29 to compensate for any variations in the magnetic characteristics of the core of the transformer. Thus it is not necessary to maintain unusually close tolerances in the manufacture of the current transformers and no air-gap is required in the core, so that the manufacturing difficulties involved with the mutual reactors previously used are eliminated and the system is at the same time made more reliable by avoiding the possibility of false operation due to large real load differences between the generators.

The resistor 29 should, of course, be chosen so that the power consumption does not exceed the allowable burden of the current transformer, and it should be small enough so that the voltage drop across the resistor is negligibly small under normal conditions. If the normal voltage drop across the resistor 29, due to the normal current flowing to the rectifier, is too great, the biasing effect may become different on overexcitation and underexcitation faults. This is due to the fact that the normal voltage drop across the resistor adds to the voltage applied by the transformer 28 on underexcitation conditions and subtracts on overexcitation conditions. Thus, if the normal voltage drop across the resistor 29 is too high, the sensitivity of the system may be somewhat different on overexcitation and underexcitation. If desired, this effect can be substantially eliminated by utilizing a capacitor in place of the resistor 29. The use of a capacitor causes the normal drop across the capacitor to be shifted by 90° with respect to the drop which appears across a resistor, and thus it does not directly add or subtract from the reactive load signals, so that the response to overexcitation and underexcitation is made substantially equal. If the value of the resistor 29 is made small enough, however, this effect is not serious and the use of a resistor is entirely satisfactory in most cases.

It will now be seen, that a protective system has been provided which provides means for detecting the occurrence of an excitation fault and for selecting the generator on which the fault has occurred. This new system represents a very material improvement on the systems previously used since it substantially eliminates any effect due to differences in real load division and does not require special components involving unusually difficult manufacturing problems.

A preferred embodiment of the invention has been shown and described for the purpose of illustration but it will be understood that various modifications and other embodiments are possible within the scope of the invention.

We claim as our invention:

1. In a control and protective system for an alternating current generator adapted for operation in parallel with other generators, means for providing a signal current proportional to the difference between the load current of the generator and the load current of another generator operating in parallel therewith, a saturable current transformer energized by said signal current, voltage response means connected to respond to a voltage proportional to the voltage of the generator, and means for applying the output voltage of said current transformer to modify the voltage to which the voltage responsive means responds.

2. In a control and protective system for an alternating current generator adapted for operation in parallel with other generators, means for providing a signal current proportional to the difference between the load current of the generator and the load current of another generator operating in parallel therewith, a saturable current transformer energized by said signal current, impedance means connected across the output voltage of said current transformer, voltage responsive means connected to respond to a voltage proportional to the voltage of the generator, and means for applying the voltage across said impedance means to modify the voltage to which the voltage responsive means responds.

3. In a control and protective system for an alternating current generator adapted for operation in parallel with other generators, means for providing a signal current proportional to the difference between the load current of the generator and the load current of another generator operating in parallel therewith, a saturable current trasformer energized by said signal current, an adjustable resistor connected across the output voltage of said current transformer, voltage responsive means connected to respond to a voltage proportional to the voltage of the generator, and means for applying the voltage across said resistor to modify the voltage to which the voltage responsive means responds.

4. In a control and protective system for an alternating current generator adapted for operation in parallel with other generators, means for providing a signal current proportional to the difference between the load current of the generator and the load current of another generator operating in parallel therewith, a saturable current transformer energized by said signal current, and adjustable resistor connected across the output voltage of said current transformer, transformer means for producing a voltage proportional to the generator voltage, means for connecting said resistor in series with the transformer means to modify the voltage produced by the transformer means, means for rectifying said modified voltage, and voltage responsive means actuated by the rectified voltage.

5. In a control and protective system for a polyphase alternating current generator adapted for operation in parallel with other generators, means for providing a signal current proportional to the difference between the load current of the generator and the load current of another generator operating in parallel therewith, a saturable current transformer energized by said signal current, means for producing a voltage proportional to the sum of the phase voltages of the generator, means for applying the output voltage of said current transformer to modify the last-mentioned voltage, and voltage-responsive means connected to respond to the modified voltage.

6. In a control and protective system for a polyphase alternating current generator, adapted for operation in parallel with other generators, means for providing a signal current proportional to the difference between the load current of the generator and the load current of another generator operating in parallel therewith, a saturable current transformer energized by said signal current, means for producing a voltage proportional to the sum of the phase voltages of the generator, impedance means connected across the output voltage of said current transformer, means for applying the voltage across said impedance means to modify said voltage proportional to the sum of the generator phase voltages, and voltage-responsive means connected to respond to the modified voltage.

7. In a control and protective system for a polyphase alternating current generator adapted for operation in parallel with other generators, means for providing a signal current proportional to the difference between the load current of the generator and the load current of another generator operating in parallel therewith, a saturable current transformer energized by said signal current, means for producing a voltage proportional to the sum of the phase voltages of the generator, an adjustable resistor connected across the output voltage of said current transformer, means for applying the voltage across said resistor to modify said voltage proportional to the sum of the generator phase voltages, and voltage-responsive means connected to respond to the modified voltage.

8. In a control and protective system for a polyphase alternating current generator adapted for operation in parallel with other generators, means for providing a signal current proportional to the difference between the load current of the generator and the load current of another generator operating in parallel therewith, a saturable current transformer energized by said signal current, transformer means for deriving polyphase voltages proportional to the generator phase voltages, rectifier means for rectifying said voltages to provide an output voltage proportional to the sum of the generator phase voltages, impedance means connected across the output voltage of said current transformer, means for connecting said impedance means in series with the transformer means to modify said rectified output voltage, and voltage-responsive means connected to respond to the modified voltage.

No references cited.